(12) United States Patent
Lin et al.

(10) Patent No.: US 9,682,335 B2
(45) Date of Patent: Jun. 20, 2017

(54) MODULAR FILTER CAPSULE APPARATUS

(71) Applicant: ZenPure Corporation, Henderson, NV (US)

(72) Inventors: ZhenWu Lin, Pasadena, CA (US); Mark D. Lorusso, Portsmouth, NH (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

(21) Appl. No.: 14/572,766

(22) Filed: Dec. 16, 2014

(65) Prior Publication Data

US 2015/0101970 A1 Apr. 16, 2015

Related U.S. Application Data

(63) Continuation-in-part of application No. 13/401,866, filed on Feb. 22, 2012.

(Continued)

(51) Int. Cl.
*B01D 35/00* (2006.01)
*B01D 27/00* (2006.01)
(Continued)

(52) U.S. Cl.
CPC ............ *B01D 35/18* (2013.01); *B01D 29/15* (2013.01); *B01D 35/153* (2013.01); *B01D 35/30* (2013.01);
(Continued)

(58) Field of Classification Search
None
See application file for complete search history.

(56) References Cited

U.S. PATENT DOCUMENTS 3,272,336 A 9/1966 Humbert
3,289,847 A 12/1966 Rothemund
(Continued)

FOREIGN PATENT DOCUMENTS

EP 2 275 188 A1 1/2011
JP 2000303816 A 10/2000
(Continued)

OTHER PUBLICATIONS

LinkTech Catalog, pp. 4-9.
(Continued)

*Primary Examiner* — Richard Gurtowski
(74) *Attorney, Agent, or Firm* — Lorusso & Associates

(57) ABSTRACT

Disclosed is a capsule apparatus having a filter housing defining a filter chamber with a top cap having a plurality of ports extending substantially laterally from a top end of the top cap. The lateral and substantially uniform orientation of the ports facilitates connection to panel mount assemblies and improves filter maintenance processes. A transfer tube extending the length of the capsule allows the introduction of heated fluids from a top mounted inlet port to a bottom of the capsule chamber to allow or a substantially uniform heat gradient in the capsule filter chamber. A dispersion ring or dispersion plate may be secured to a distal end of the transfer tube to promote uniform dispersion of liquids and/or gases introduced into the capsule apparatus. An alternative shield secured in the housing defines a first chamber in fluid communication with an inlet and a second chamber wherein the two chambers are in fluid communication via an opening defined by a lower end of the shield and a bottom of the filter chamber. An alternative capsule apparatus has an outlet tube extending downwardly from a top mounted outlet port in fluid communication with an enclosed filter membrane secured below a column of loose filter media.

39 Claims, 10 Drawing Sheets

Related U.S. Application Data

(60) Provisional application No. 61/446,487, filed on Feb. 24, 2011.

(51) Int. Cl.

| | | |
|---|---|---|
| *B01D 39/00* | (2006.01) | |
| *B01D 35/18* | (2006.01) | |
| *B01D 46/30* | (2006.01) | |
| *B01D 46/42* | (2006.01) | |
| *B01D 35/30* | (2006.01) | |
| *B01D 36/00* | (2006.01) | |
| *B01D 29/15* | (2006.01) | |
| *B01D 35/153* | (2006.01) | |
| *B01D 46/24* | (2006.01) | |

(52) U.S. Cl.
CPC ....... *B01D 36/001* (2013.01); *B01D 46/2414* (2013.01); *B01D 46/30* (2013.01); *B01D 46/4263* (2013.01); *B01D 46/4272* (2013.01); *B01D 2201/167* (2013.01); *B01D 2201/303* (2013.01)

(56) References Cited

U.S. PATENT DOCUMENTS

| | | |
|---|---|---|
| 3,770,127 A | 11/1973 | White |
| 3,777,889 A | 12/1973 | Henderson |
| 3,986,960 A | 10/1976 | Wire et al. |
| 4,000,482 A | 12/1976 | Staub et al. |
| 4,045,345 A | 8/1977 | Drori |
| 4,524,887 A | 6/1985 | Cocks |
| 4,666,598 A | 5/1987 | Heath et al. |
| 4,725,354 A | 2/1988 | Thomsen et al. |
| 5,094,750 A | 3/1992 | Kopp et al. |
| 5,601,710 A | 2/1997 | Yoon et al. |
| 5,762,789 A | 6/1998 | Reyes et al. |
| 5,798,040 A | 8/1998 | Liang |
| 5,919,357 A | 7/1999 | Wilkins et al. |
| 6,105,664 A | 8/2000 | Gillbrand et al. |
| 6,159,363 A | 12/2000 | Collins et al. |
| 6,290,848 B1 * | 9/2001 | Tanner ............... C02F 1/003 210/266 |
| 7,081,201 B2 | 7/2006 | Bassett et al. |
| 7,195,122 B2 | 3/2007 | Hiranaga et al. |
| 7,247,245 B1 | 7/2007 | Proulx et al. |
| 7,338,599 B2 | 3/2008 | Hiranaga et al. |
| 7,407,594 B2 | 8/2008 | Laverdiere et al. |
| 7,794,594 B2 | 9/2010 | Diemer et al. |
| 2001/0000893 A1 | 5/2001 | Hopkins et al. |
| 2004/0211717 A1 | 10/2004 | Mitchell et al. |
| 2006/0060512 A1 * | 3/2006 | Astle ............... B01D 27/101 210/85 |
| 2006/0186031 A1 | 8/2006 | Fick et al. |
| 2007/0119772 A1 * | 5/2007 | Hiranaga ............. B01D 27/08 210/436 |
| 2008/0213135 A1 * | 9/2008 | Burke ............... B29C 65/02 422/400 |
| 2010/0282665 A1 | 11/2010 | Pradel et al. |
| 2012/0223002 A1 | 9/2012 | Lin |
| 2014/0263106 A1 | 9/2014 | Hampton et al. |

FOREIGN PATENT DOCUMENTS

| | | |
|---|---|---|
| WO | WO 97/26066 | 7/1997 |
| WO | WO 0183077 | 11/2001 |
| WO | WO 2009069402 | 4/2009 |

OTHER PUBLICATIONS

Polytech Filtration Systems, Inc, (2008).
Millipore Millistak + HC Stacked Disc Filters (2011).
Yamit E.L.I. Manual and Semi-Automatic Screen Filters.
Eaton Tubular Backwashing Filter brochure (2011).
Thurrott/Chisholm Inc. Filter Housings (website product list).

\* cited by examiner

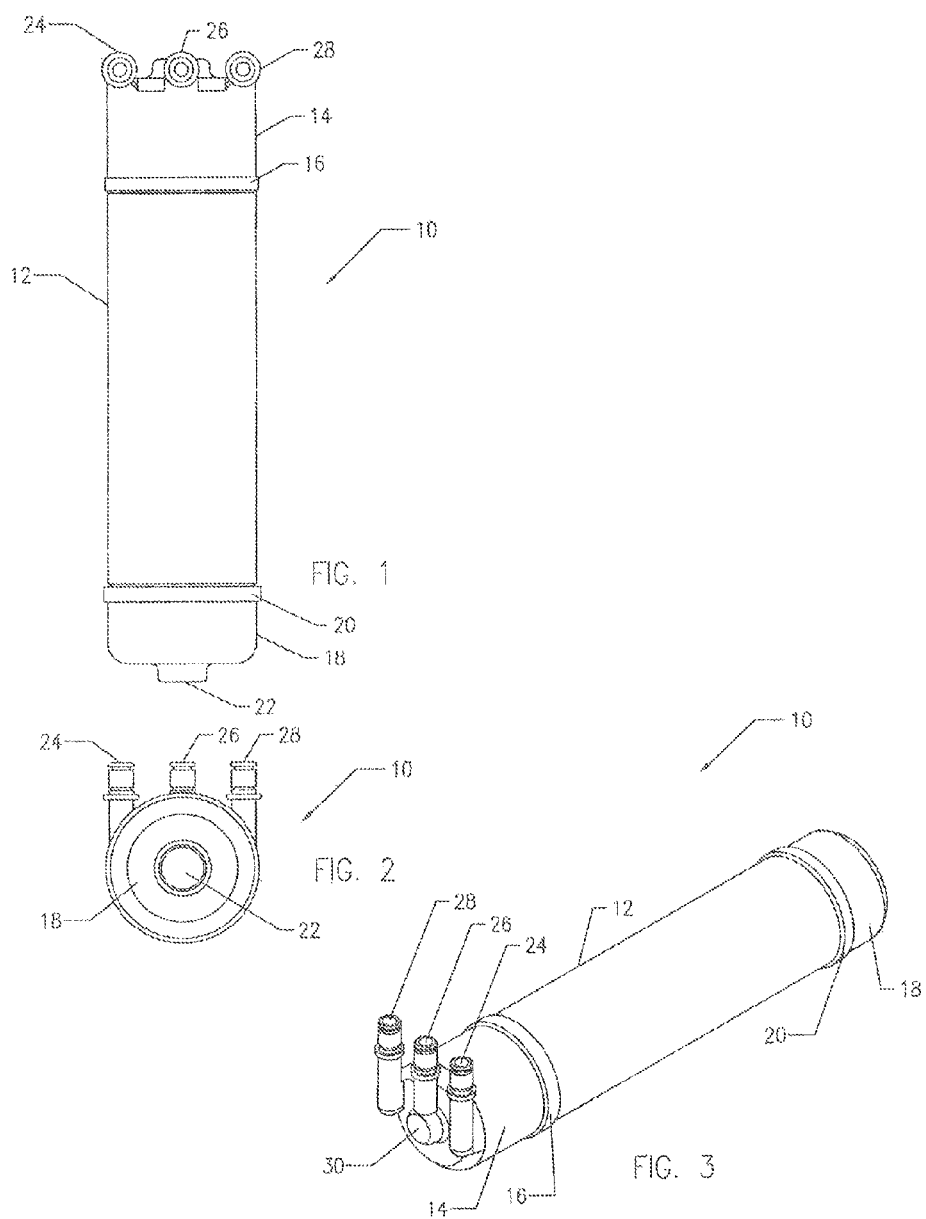

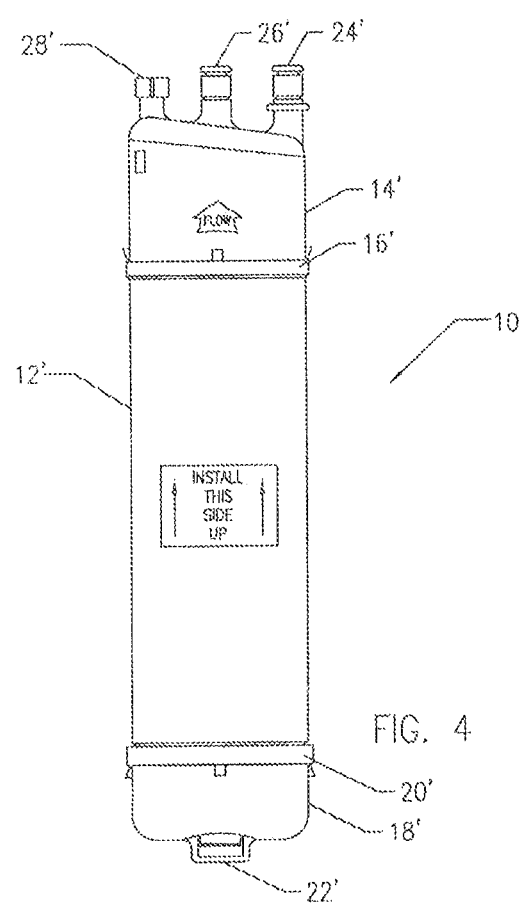

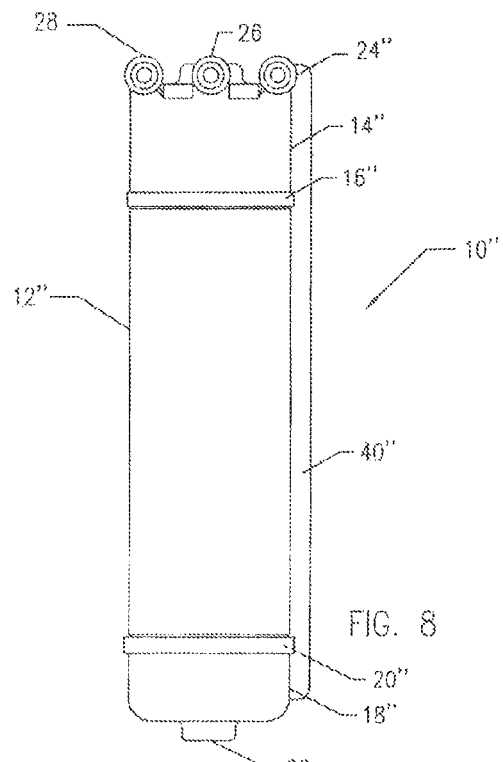
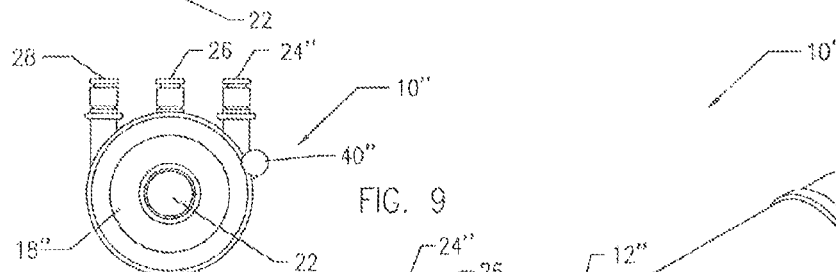
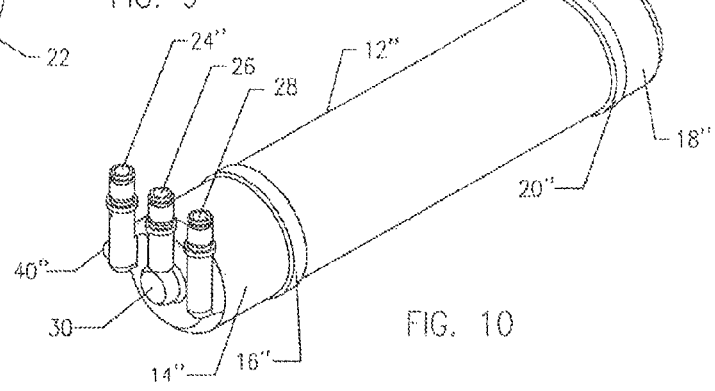

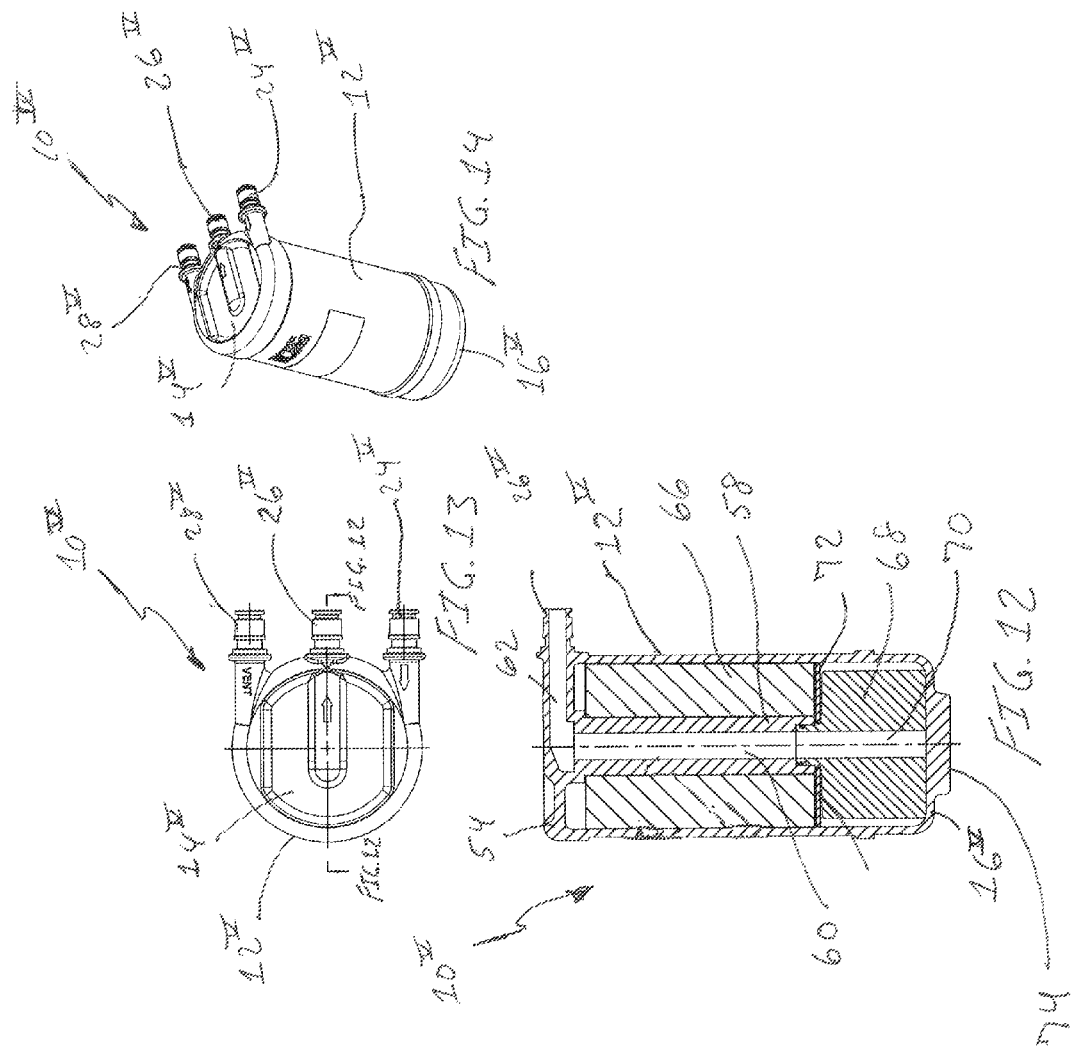

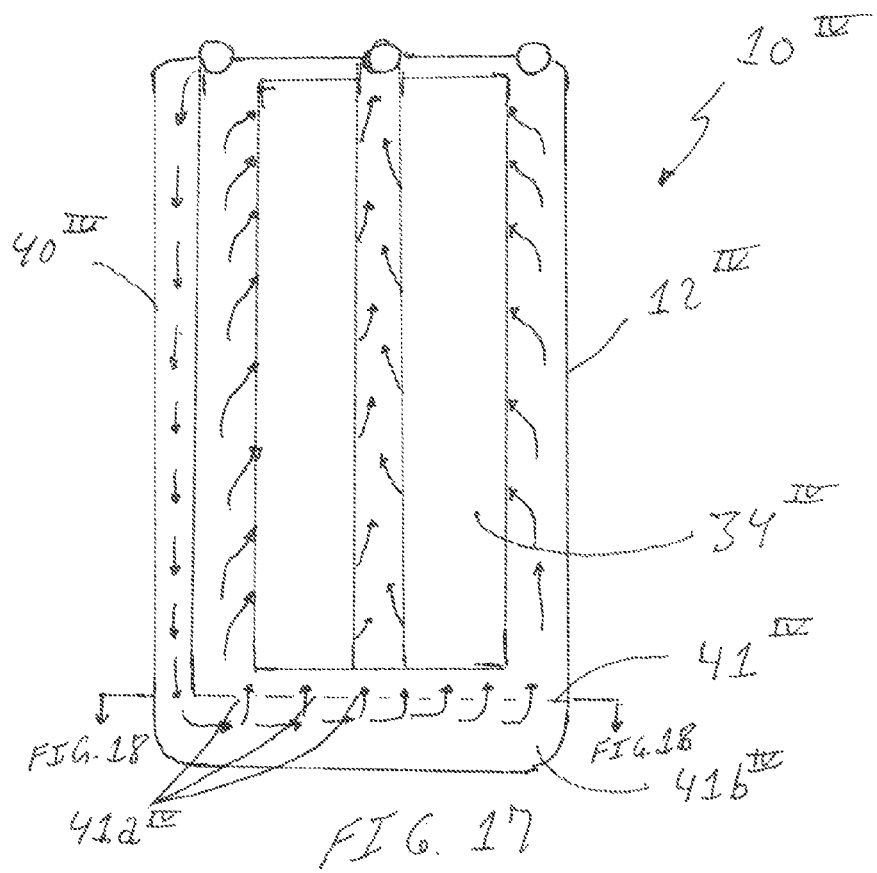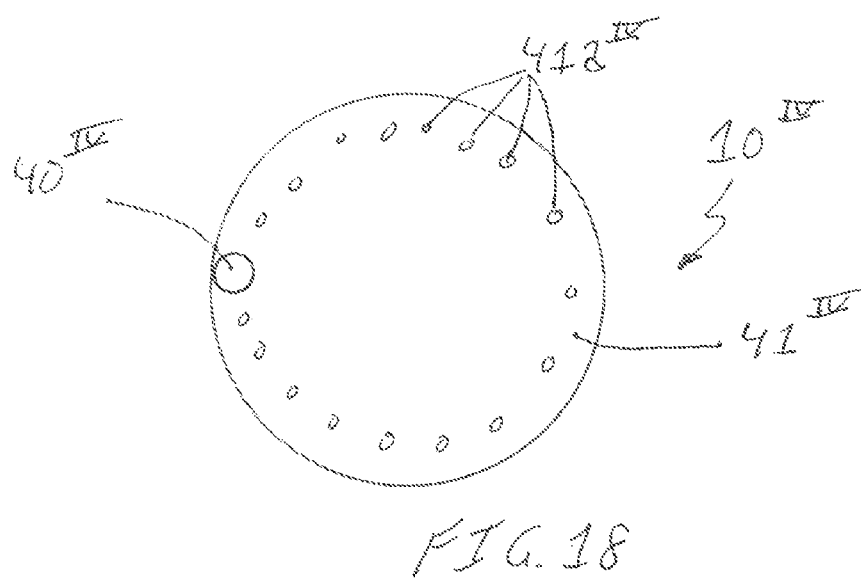

MODULAR FILTER CAPSULE APPARATUS

CROSS-REFERENCE TO RELATED APPLICATIONS

This application is a continuation-in-part of U.S. Regular Utility application Ser. No. 13/041,866 filed Feb. 22, 2012 that claimed the benefit of U.S. Provisional Application Ser. No. 61/446,487 filed Feb. 24, 2011, the contents both of which are incorporated in their entirety herein by reference.

FIELD OF THE DISCLOSURE

The disclosure relates to filter capsule apparatus used to enclose filters that separate and remove solid, liquid and/or gaseous contaminants and/or intermix and introduce one liquid or gas into a second liquid or gas. More particularly, the disclosure concerns combined filter shell or housing, enclosed filter and filter capsule inlet and outlet configurations to improve uniform heat transmission of heated or cooled liquids introduced into a filter capsule apparatus, to permit the combined use of loose media and filter membranes and cartridges as well as to improve the serviceability and adaptability to larger assemblies.

BACKGROUND OF THE DISCLOSURE

To filter liquids and/or gases of undesired contaminants, filters and/or purification media e.g., granular resins, granulated carbon, carbon fiber, soda lime and the like, are used in enclosed filter housings to effectuate contaminant removal. In a common filter capsule configuration, ports are positioned to occupy different planes or extend from the capsule in different directions, such as shown in published application No.: US 2010/0282665. In that application, the inlet and outlet ports are positioned at diametrically opposed locations at the top end of the capsule. This configuration requires a substantial amount of space within a larger assembly to receive the capsule and to secure the ports, which thereby limits the possible orientation variations if a panel mount configuration is desired. It further increases the effort needed to attach the capsule as connections have to be made at two entirely different locations. What is needed is a filter capsule having ports oriented to extend from a capsule in a uniform direction to reduce the space required for attachment to a larger assembly and to facilitate the simultaneous connection of multiple tubes for the ingress and egress of desired fluids and/or gases.

A further problem associated with filter capsules, particularly those with inlet ports located at the tops of the capsules, is post filtration sanitation. The infusion of hot liquids (or even in some applications, the introduction of cooled liquids and/or gases), such as hot water for sanitation processes, results in the formation of a significant temperature gradient whereby liquid introduced into the top end of the filter capsule (the locus of the inlet port), has a much higher temperature than the liquid located at the bottom of the capsule. What is needed is an inlet system that originates from a filter capsule top, but that directs incoming hot (or cooled) liquids to the bottom of the capsule to harness rising heat transfer in the introduced liquids and/or gases to create a significantly more uniform temperature gradient from bottom to top.

A yet further problem results when trying to combine loose particulate (e.g., resin) based filters such as activated carbon with membrane or cartridge based filters constructed from membrane and fibrous type filter media. Loose resin based filter materials such as activated carbon filters are particulate and create flow fields that only permit liquid and/or gas flow in a single direction. The addition of a cartridge based filter with a defined and designated downstream core, positioned downstream of the loose particulate material, further limits the location of an outlet port at a downstream or bottom end of the capsule. For applications with tight spatial requirements, it is not currently possible to position an outlet at the top or upstream end of a capsule when using loose material, e.g., loose particulate based filter media. What is needed is a filter capsule construction that permits the location of the outlet port at the top of the filter capsule when using loose particular filter media. These and other objects of the disclosure will become apparent from a reading of the following summary and detailed description of the disclosure as well as a review of the appended drawings.

SUMMARY OF THE DISCLOSURE

In one aspect of the disclosure, a capsule apparatus for enclosing filters includes a plurality of ports extending from a top end of the apparatus whereby at least a portion of each port extends at an angle substantially orthogonal to the longitudinal axis of the capsule. Alternatively, the angle may deviate by about +/−30°, and as much as +/−45° from the orthogonal orientation. The ports are further oriented to extend from the capsule in the same general direction and occupy substantially the same plane. Each port is dedicated to a particular function, e.g., ingress (inlet), egress (outlet) and exhaust (vent).

In another aspect of the disclosure, at least two ports include quick coupling fittings to facilitate expedient, efficient and reliable connection and disassembly to larger assemblies, or to dedicated ingress or egress (and optionally exhaust) tubes. Each coupling may be configured as either a male or female fitting to accommodate a variety of connection configurations and requirements. Each coupling may further be configured to include a check valve integrated with either a male or female configured fitting.

In a yet further aspect of the disclosure, a fluid inlet is formed and positioned at a top end of a filter capsule. A transfer tube is formed on, inside, or in a wall of the filter capsule and extends along the length of the filter capsule wall. The inlet is connected to, and in fluid communication with, a proximal end of the transfer tube. A distal end of the tube extends at least proximal to a bottom end of the capsule. The distal end opens into the filter chamber and allows for the flow of fluids introduced into the tube to flow into the filter chamber from a bottom end of the chamber. An optional dispersion ring with a plurality of bores or slots may be formed or secured in a bottom end of the filter chamber in fluid communication with a bottom or distal end of the transfer tube. In a yet further alternative embodiment, a dispersion plate with a plurality of bores or slots formed therein may be placed in, or formed in, the filter chamber in close proximity to a bottom end of the chamber to create a dispersion chamber for the uniform dispersion of liquids and/or gases about the enclosed filter cartridge/filter introduced into the filter chamber via the transfer tube.

In a still further aspect of the disclosure, a filter capsule includes a cylindrical shield formed or placed inside the capsule between the capsule inner wall and a filter secured therein. The shield extends from substantially the top of the inner capsule to a point or plane in close proximity to, but not in substantial contact with, a bottom of the capsule so as to form a gap between a bottom edge of the shield and the inner wall of the capsule bottom. The shield combines with the capsule inner wall to form a first annular chamber that extends substantially from the inner top of the capsule to a point or plane in close proximity to, but not in contact with, the bottom of the capsule. A second annular chamber is formed between an inner wall of the shield and the enclosed filter. The gap formed at the bottom between the shield and the capsule bottom allows fluid communication between the chambers at the bottom of the capsule. An inlet extending from the capsule in fluid communication with the first chamber allows fluid to flow from the inlet down through the first annular chamber, through the gap and up into the second, filter-containing chamber.

In a yet further aspect of the disclosure, an apparatus for securing and containing a filter includes a capsule having a series of ports extending from a top end of the capsule. Each port is oriented to extend substantially along the longitudinal axis of the capsule. The ports are configured to extend in substantially the same direction so as to facilitate manual connection to larger assemblies including panel mounts.

In another aspect of the disclosure, a filter capsule houses a filter cartridge or membrane and loose particulate filter material with an outlet tube extending downwardly and in fluid communication with an outlet port. The filter cartridge defines a downstream core in fluid communication with the outlet tube. This permits the inlet and outlet ports to be aligned at the same end of the capsule with a unique flow pattern to permit the use of the loose particulate filter material. These and other aspects of the disclosure will become apparent from a review of the appended drawings and a reading of the following detailed description of the disclosure.

BRIEF DESCRIPTION OF THE DRAWINGS

FIG. 1 is a side elevational view of a filter capsule according to one embodiment of the disclosure.

FIG. 2 is a bottom view of the filter capsule embodiment shown in FIG. 1.

FIG. 3 is a perspective view of the filter capsule embodiment shown in FIG. 1.

FIG. 4 is a side elevational view of a filter capsule according to another embodiment of the disclosure.

FIG. 8 is a side elevational view of a filter capsule according to a further embodiment of the disclosure.

FIG. 9 is a bottom view of the filter capsule embodiment shown in FIG. 8.

FIG. 10 is a perspective view of the filter capsule embodiment shown in FIG. 8.

FIG. 12 is a sectional view in elevation of a filter capsule with aligned ports and a central tube according to another embodiment of the disclosure.

FIG. 13 is a top view of the filter capsule shown in FIG. 12.

FIG. 14 is a top side perspective view of the filter capsule shown in FIG. 12.

FIG. 17 is a side sectional view in elevation of a filter capsule with a transfer tube and a dispersion plate according to yet another embodiment of the disclosure.

FIG. 18 is a top view of the transfer tube and dispersion plate shown in FIG. 17.

DETAILED DESCRIPTION OF THE DISCLOSURE

Figure 5:
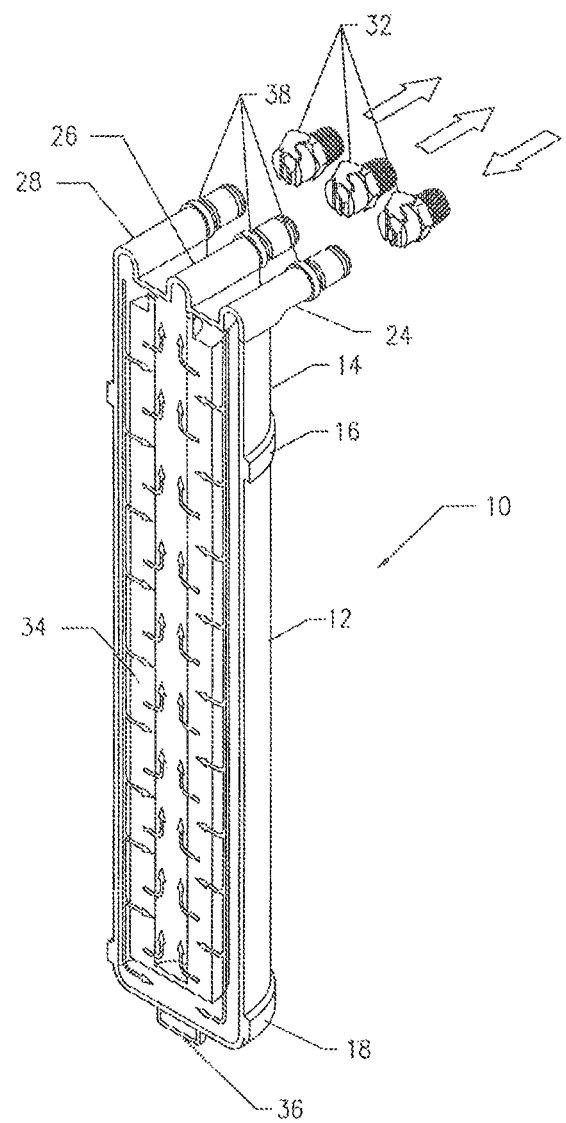
FIG. 5 is a sectional, perspective view of a filter capsule and port fittings according to one embodiment of the disclosure.

Referring to FIGS. 1-3 and 5-7, in one aspect of the disclosure, a filter capsule apparatus is shown designated generally as 10. Capsule 10 includes a substantially cylindrical body 12 that defines a generally hollow filter chamber configured to hold one or more filter cartridges or filters 34. Capsule 10 may be formed in other regular or irregular geometric shapes to accommodate a wide variety of larger assembly configurations to which the capsule is attached and/or to accommodate a wide variety of filter shape configurations depending upon the application. The capsule is dimensioned so as to provide an uninterrupted annular space about the enclosed filter or filter cartridge 34 to ensure unimpeded flow of fluids along the axial length of the filter cartridge . . . .

To enclose a top end of capsule 10, a top cap 14 having a substantially cylindrical shape (or other shape depending on the cross-sectional shape of the capsule body) conformed to the shape and dimensions of capsule body 12 and having an enclosed end and an opposing open end is thermally welded to the open end of body 12 to form a top cap joint 16. In an alternative embodiment, body 12 and top cap 14 may be formed with corresponding threaded surfaces or male/female segments as alternative means to secure top cap 14 to body 12. If snap-fit surfaces are used, sealing components, e.g., O-rings with corresponding mounting channels may be used to create an air/fluid tight seal. Adhesives, epoxies and the like may also be used to secure cap 14 to body 12.

Top cap 14 may be joined to body 12 before or after the installation of filters depending upon whether the other end of body 12 has been closed. In a further alternative embodiment, top cap 14 is formed together with body 12 in the same molding process. In this embodiment a bottom cap, disclosed below, is not formed in the same molding process as top cap 14 and capsule body 12.

For capsule bodies without an integral bottom, to enclose the bottom end of capsule body 12, a bottom cap 18 having a substantially cylindrical shape (or other shape depending on the cross-sectional shape of the capsule body) conformed to the shape and dimensions of body 12 and having an enclosed end and an opposing open end is thermally welded to the open end of capsule 10 to form bottom cap joint 20. In an alternative embodiment, body 12 and bottom cap 18 may be formed with corresponding threaded surfaces or male/female segments as alternative means to secure bottom cap 18 to body 12. If snap-fit surfaces are used, sealing components, e.g., O-rings may be used to create an air/fluid tight seal. Adhesives, epoxies and the like may also be used to secure bottom cap 18 to body 12.

Bottom cap 18 may be joined to body 12 before or after the installation of filters depending upon whether the other end of body 12 has been closed, if modular, or closed as part of the formation process of body 12. In a further alternative embodiment, bottom cap 18 is formed together with body 12 in the same molding process. In this embodiment, a top cap, disclosed above, is not formed in the same molding process as bottom cap 18 and capsule body 12.

Bottom cap 18 may be formed with a mounting post 22 configured to receive corresponding mounting appendages from a larger assembly such as a mounting panel. The combination of capsule body 12, top cap 14 and bottom cap 18 form capsule 10.

In a further alternative embodiment, in place of mounting post 22, a drainage port may be formed in bottom cap 18 to allow fluids to be drained from the bottom end of capsule 10 without the need to engage a port formed in top cap 14 dedicated as an outlet port as more fully described below. The drainage port may be configured with a male or female connector end and may also include quick connect fittings and a modular or integrated check valve to prevent the unwanted flow of fluids and/or gases from the capsule.

Formed on, integral with, or appended to, top cap 14, are a plurality of ports configured for connection to, and to provide fluid communication with, liquid/gas delivery and/or extraction sources. The ports may be formed with appendages, annular channels, etc., to receive sealing components, e.g., O-rings. More specifically, a cannula-shaped, essentially hollow, inlet port 24 is formed on, or secured to, a lateral edge of top cap 14 to provide a means to infuse fluids and/or gases into the filter chamber formed within capsule 10. The location of the interface/juncture of inlet port 24 with top cap 14 may be positioned at other locations about the cap other than the lateral edge of top cap 14.

Inlet port 24 includes modular or integral male or female fittings to accommodate and receive corresponding fittings 38 of fluid delivery tubes or channels to allow fluids and/or gases to traverse the tube/port juncture in an essentially leak free, airtight manner. Inlet port 24 may also include an integral or modular check valve to prevent the release of fluids or spillage when capsule 10 is disassembled to remove, replace or service the internal filter(s).

Formed on, integral with, or appended to, a lateral edge of top cap 14 opposite the lateral edge occupied by inlet port 24 is a cannula-shaped, essentially hollow, vent port 28. Vent port 28 is formed on, or secured to, top cap 14 to provide a means of egress for unwanted liquids and/or gases present in the filter chamber defined by capsule 10. The location of the interface/juncture of outlet port 28 may be positioned at other locations about the cap other than a lateral edge of top cap 14.

Vent port 28 is initially opened to vent out resident gas when capsule 10 is being filled with the desired liquid and/or gas. Vent port 28 is otherwise closed during normal operation, or periodically opened for limited periods of time to allow the release of unwanted accumulated air and/or gas in the filter chamber.

Vent port 28 includes modular or integral male or female fittings to accommodate and receive corresponding fittings 38 of fluid receiving tubes or channels to allow fluids and/or gases to traverse the tube/port juncture in an essentially leak free, airtight manner. Vent port 28 may also include an integral or modular check valve to prevent the release of fluids or spillage when capsule 10 is disassembled to remove, replace or service the internal filter(s).

Also appended to top cap 14 is outlet port 26. Outlet port 26 may be formed on, integral with, or appended to, top cap 14 at essentially the center of cap 14. A cylindrical projection 30 may be formed as an interface between top cap 14 and outlet port 26. Projection 30 forms a chamber above the plane occupied by the top surface of top cap 14 that allows the flow of air, gas or fluids to collect in the chamber and migrate out of capsule 10 after being purified through the enclosed filter. It is particularly advantageous in fluid-based applications to allow the collection and elimination of any unwanted air and/or gas that may have entered the capsule. Should particulate matter pass through filter 34, chamber 30 provides an area for the particulate matter to collect so as to minimize any impediment the particulate matter may have on the egress of fluids and/or gases out of capsule 10.

This configuration further allows capsule 10 to be completely filled with a desired fluid and/or gas up to the highest point of the enclosed filter to ensure full utilization of the entire filter. In this manner, utilization of substantially the entire chamber area dedicated to housing one or more filters can be maximized for the intended purpose. Projection 30 further does not impact the overall capsule length as the desired length can be maintained by adjusting the outlet height to match the heights of the inlet and vent ports that may be longer when projection 30 is incorporated into top cap 14.

Outlet port 26 includes modular or integral male or female fittings to accommodate and receive corresponding fittings 38 of fluid receiving tubes or channels to allow fluids and/or gases to traverse the tube/port juncture in an essentially leak free, airtight manner. Outlet port 26 may also include an integral or modular check valve to prevent the release of fluids or spillage when capsule 10 is disassembled to remove, replace or service the internal filter(s).

It should be understood that the flow of fluids and/or gases through the various ports can be reversed without any reduction in function of the filter capsule. More specifically, what has been identified as inlet port 24 may function as an outlet port and what has been identified as outlet port 26 may function as an inlet port. In addition, what has been identified as vent port 28 may be utilized as either an inlet, or an outlet, port. The apparatus is designed to permit functional flow in either direction.

In this aspect of the disclosure, ports 24, 26, 28 are oriented in substantially the same plane wherein each port extends laterally from capsule 10 at an angle substantially orthogonal to a longitudinal axis of capsule 10. Alternatively, the ports may align with, or be parallel to, the orthogonal axis, or form an angle with the longitudinal axis about +/−45° from the orthogonal orientation. The ports may or may not occupy the same plane and instead, be offset to accommodate attachment to larger customized assemblies.

In a yet further alternative, each port may have a stem portion extending from top cap 14 substantially parallel with the longitudinal axis of capsule 10 and a distal portion continuous with the stem portion that deviates from the parallel orientation with the capsule longitudinal axis. The distal portion forms an angle with the stem portion wherein the distal portion occupies a plane substantially orthogonal to the capsule longitudinal axis. Alternatively, the distal portions may form an angle with the longitudinal axis of the capsule about +/−30° from the orthogonal orientation. The stem portion length can be varied to control the overall length of the capsule.

Referring again to the configuration wherein the ports extend laterally from the top cap 10, this configuration reduces the overall height of the apparatus to enable the apparatus to fit within tight dimensional portions of larger assemblies without any appreciable diminishment in the amount of capsule space dedicated to house one or more filters. The substantially unidirectional port orientation also facilitates installation onto, or into, larger assemblies, particularly panel mount assemblies, as all connection surfaces, i.e., ports face substantially the same direction. The addition of quick couplings further eases installation. A yet further advantage is experienced as the location of all the ports at substantially the highest point of capsule 10 allows for removal of the lower-positioned enclosed filters substantially without spillage.

Figure 6:
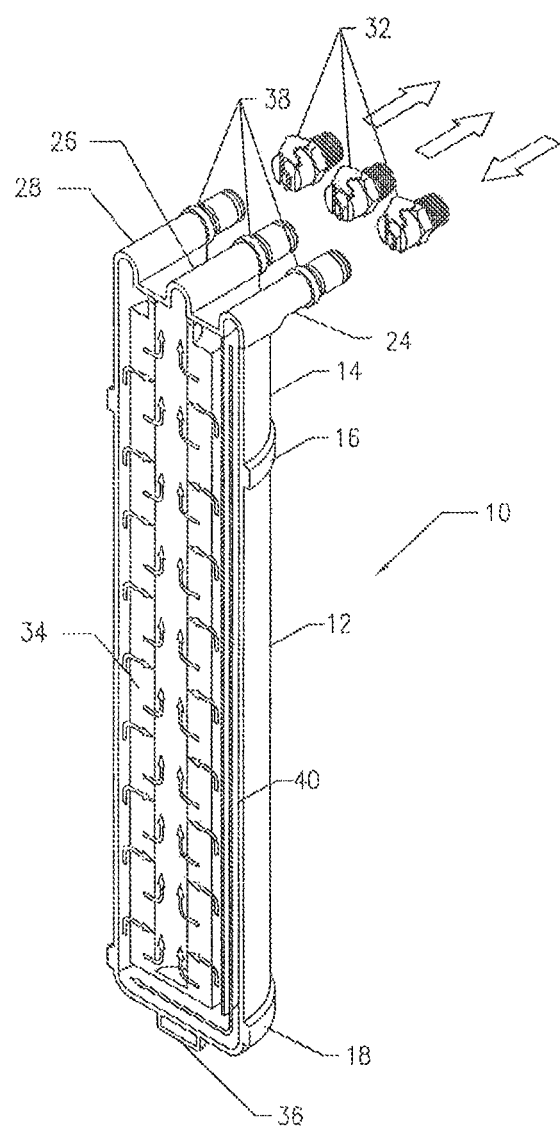
FIG. 6 is a sectional, perspective view of a filter capsule and port fittings according to another embodiment of the disclosure.

In another aspect of the disclosure as shown in FIG. 6, a transfer tube 40 is formed integral with, or appended to, an inside wall of capsule 10 to provide a channel for delivering warm and/or cold liquids and/or gases from a top end of capsule 10 to a bottom end of the capsule without requiring the liquid and/or gas to first migrate through the filter chamber. A top end of the transfer tube is connected to, and in fluid communication with, inlet port 24. If the middle port 26 should be designated as the inlet port, tube 40 would be connected to that port to provide the desired function described below. A bottom end of the transfer tube is open to, and in fluid communication with a bottom end of the filter chamber formed and defined by capsule 10. The bottom end of the transfer tube is positioned in close proximity to the bottom end of the filter chamber to introduce fluids at the lowest point in the filter chamber. This maximizes the beneficial effect of the transfer tube to deliver hot liquids into the chamber and allow the rising heat to minimize the development of a temperature gradient along the length of capsule 10.

As shown in FIG. 6, fluid introduced into the capsule via inlet port 24 flows to the bottom of capsule 10 via tube 40 and flows up through the uninterrupted annular space formed between the inner wall of capsule 10 and the outer cylindrical wall of filter 34. The fluid then traverses the filter toward the center of capsule 10 and up and out through outlet port 26. With this configuration, heated or cooled fluids or gases introduced into capsule 10 flow to the bottom of the capsule first before entering into the filter. In this manner, normal heat dynamics cause the heated fluids/gases to rise up the chamber and dissipate heat, or promote cooling. The continual transfer of heated or cooled liquids/gases into the bottom of the capsule while previously introduced fluids exit transfer tube 40 and rise up the capsule creates a counter-current effect that minimizes the heat gradient differential from the top to the bottom of the capsule.

Figure 15:
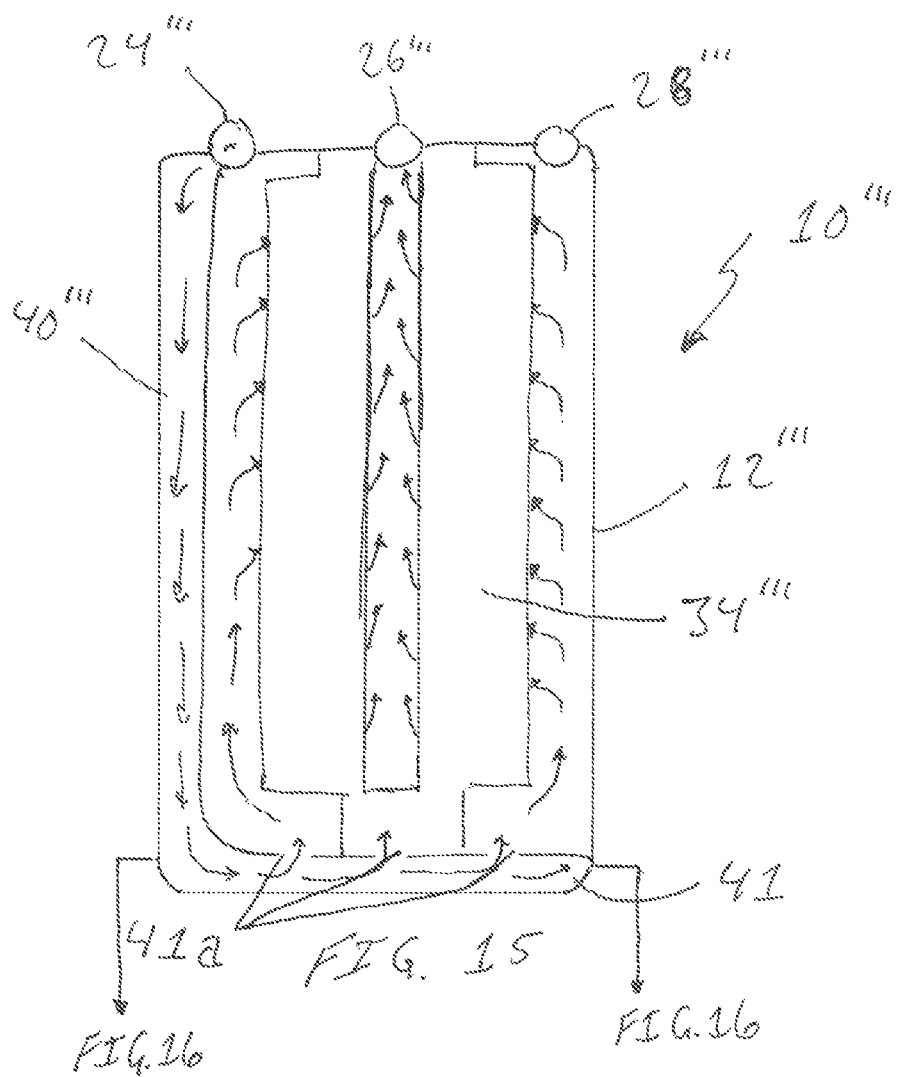
FIG. 15 is a side sectional view in elevation of a filter capsule with a transfer tube and dispersion ring according to a further embodiment of the disclosure.
Figure 16:
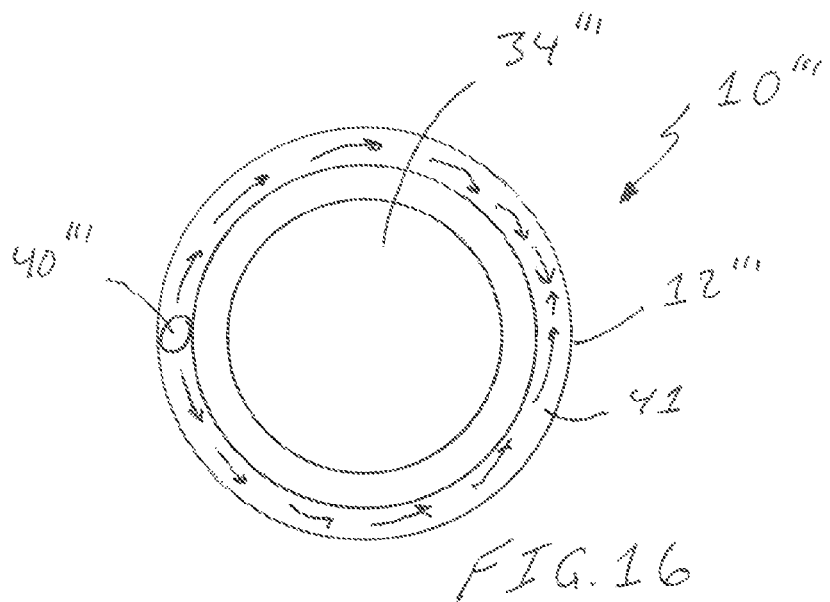
FIG. 16 is a top sectional view of the transfer tube and dispersion ring shown in FIG. 15.

In a further aspect of the disclosure as shown in FIGS. 15 and 16, a filter capsule shown generally as 10''' includes a housing 12''' that defines a filter chamber within which a filter 34''' is secured. The capsule has an inlet port 24''', and outlet port 26''' and an optional vent port 28'''. A transfer tube 40''' extends from a top end of the capsule to a point or plane proximal to the bottom and is in fluid communication with inlet port 24'''. Formed or positioned in a bottom end of the filter chamber is a dispersion ring 41 that defines a channel about the perimeter of the filter chamber bottom end. The channel is in fluid communication with transfer tube 40'''. A plurality of bores or slots 41a are formed in dispersion ring 41 to permit the flow of liquids and/or gases (heated or cooled) introduced into transfer tube 40''' via inlet port 24''' to flow about the bottom end of the filter chamber in a uniform manner to ensure the liquids and/or gases flowed into the chamber substantially simultaneously from all sides of the filter chamber are substantially uniform in temperature.

In a yet further aspect of the disclosure as shown in FIGS. 17 and 18, a filter capsule shown generally as 10$^{iv}$ includes a housing 12$^{iv}$ that defines a filter chamber within which a filter 34$^{iv}$ is secured. The filter chamber is dimensioned to ensure an uninterrupted annular space is maintained about filter 34$^{iv}$ to permit the unimpeded flow of liquids along the axial length of the filter. The capsule has an inlet port 24$^{iv}$, and outlet port 26$^{iv}$ and an optional vent port 28$^{iv}$. A transfer tube 40$^{iv}$ extends from a top end of the capsule to a point or plane proximal to the bottom and is in fluid communication with inlet port 24$^{iv}$. Formed or positioned in a bottom end of the filter chamber is a dispersion plate 41$^{iv}$ that defines a dispersion chamber 41b at the bottom end of the filter chamber. Chamber 41b is in fluid communication with transfer tube 41$^{iv}$. A plurality of bores or slots 41a$^{iv}$ are formed about the perimeter of plate 41$^{iv}$ to permit liquids and/or gases introduced into the chamber to exit up into the portions of the chamber surrounding the enclosed filter 34$^{iv}$. It should be understood that the bores may also be formed within any part of the field of the dispersion plate to permit fluids to exit the chamber and travel up into the filter chamber. Location of the bores about the perimeter of the dispersion plate is particularly advantageous if the enclosed filter is secured at its bottom end to the dispersion plate, or to the bottom of housing 12$^{iv}$. Should the filter be secured to the inner surface of the bottom of the housing, the dispersion plate can be formed as a ring about the bottom end of the filter/filter cartridge dedicated to secure the filter/filter cartridge to the housing. In this configuration, the dispersion chamber will be annular in shape and will have a series of bores about the entire plate to ensure uniform delivery of heated or cooled fluids, the temperature of which is maintained substantially uniform about the dispersion chamber and the filter/filter cartridge. The filter cartridge/filter may be secured to the bottom of the filter capsule or dispersion plate with friction fit components, O-ring(s), thermal or sonic bonding, adhesives, combinations of the joining methods and the like.

Referring again to FIG. 6, transfer tube 40 avoids the creation of significant thermal gradients that would occur without the presence of transfer tube 40. Without tube 40, fluid introduced into capsule 10 would follow the flow pattern illustrated in FIG. 5. The fluid would enter the capsule from the top, flow down the capsule via gravity feed and traverse filter 40 while flowing down the capsule. Once the fluid flowed through the filter, it would enter the center of capsule 10 and flow out outlet 26. In this configuration, any heated liquid or gas introduced into the capsule would lose heat as it travels down the capsule (via gravity or pressure assist) and flows into filter 34. In doing so, a relatively large temperature gradient is created whereby the fluid at the top of capsule 10 would have a much higher temperature than the fluid at the bottom of capsule 10.

To achieve a specific fluid temperature or target temperature at the bottom of capsule 10, fluid introduced into the capsule from a top end would have to have a higher temperature than the target temperature to account for heat loss as the heat transfers to fluid toward the bottom of the capsule. This is particularly problematic when the fluid introduced into the capsule is intended to act as a cleaning and/or sanitization fluid with a required temperature. When the liquids or gases reach the bottom of the capsule housing, the constant transfer of heat up the housing chamber will lead to an unacceptably low liquid or gas temperature at the bottom of the housing that can prevent proper cleaning and/or sanitization of the enclosed filter cartridge/filter.

Use of transfer tube 40 substantially eliminates these problems by harnessing well known fluid thermal dynamic properties pursuant to which fluid seeks to reach thermal equilibrium by transferring heat from relatively high heat, relatively low density fluid to fluid having relatively low heat and relatively high density. By introducing the relatively high heat liquids and/or gases at the bottom of the capsule housing, relatively lower temperature, denser liquids positioned at a higher elevation than the introduced high heat liquid or gas, will result in heat transfer up into the cooler liquid and prevent the creation of a significant temperature gradient as well as prevent the presence of any liquid or gas at an unacceptably relatively low temperature throughout the capsule. These are the conditions that become extant in a filter capsule when fluid having relatively high heat and relatively low density is introduced into the bottom of the capsule. The heat transfers naturally and more efficiently when travelling from the bottom to the top of the capsule. In this manner, the fluid in the capsule is maintained at a much more uniform temperature along the entire length of the capsule as heat transfers up the enclosed fluid.

In an alternative embodiment, to further minimize the temperature gradient, a check valve can be formed integral to, or installed within a distal end of, transfer tube 40 to prevent backflow of the fluid and/or gas up the transfer tube and into inlet port 24. This ensures any heated fluid introduced into the capsule reaches the bottom of the capsule so as to maintain maximum heat uniformity and efficiency.

In a further embodiment of the disclosure, the transfer tube is formed on an outside surface of capsule 10 A top end of the tube is connected to, and in fluid communication with, inlet port 24. A bottom end of the tube is connected to a bore formed in either a bottom end of capsule body 12, or a side wall of bottom cap 18 so as to provide fluid communication with the bottom interior of capsule 10 and permit fluid entry into the capsule at the lowest point of the filter chamber defined by the capsule.

With the use of the transfer tube positioned outside the filter capsule housing wall, embedded in the wall, or formed on, or attached to, the inner surface of the housing wall, liquids and/or gases, and heated liquids and/or gasses in particular, can be introduced into the filter chamber at substantially the bottom-most end of the filter chamber to allow the heat introduced into the chamber to flow up into the higher layers of fluid and/or gas to ensure a relatively uniform temperature gradient. Prior art systems have the top-mounted inlet ports configured to channel fluids and/or gasses into the uppermost end of the filter chamber which causes the formation of substantial temperature gradients as the cooler, more dense fluid and/or gas tends to migrate to the bottom of the chamber while the hotter, less dense fluid and/or gas tends to remain in the upper end of the chamber.

Figure 7:
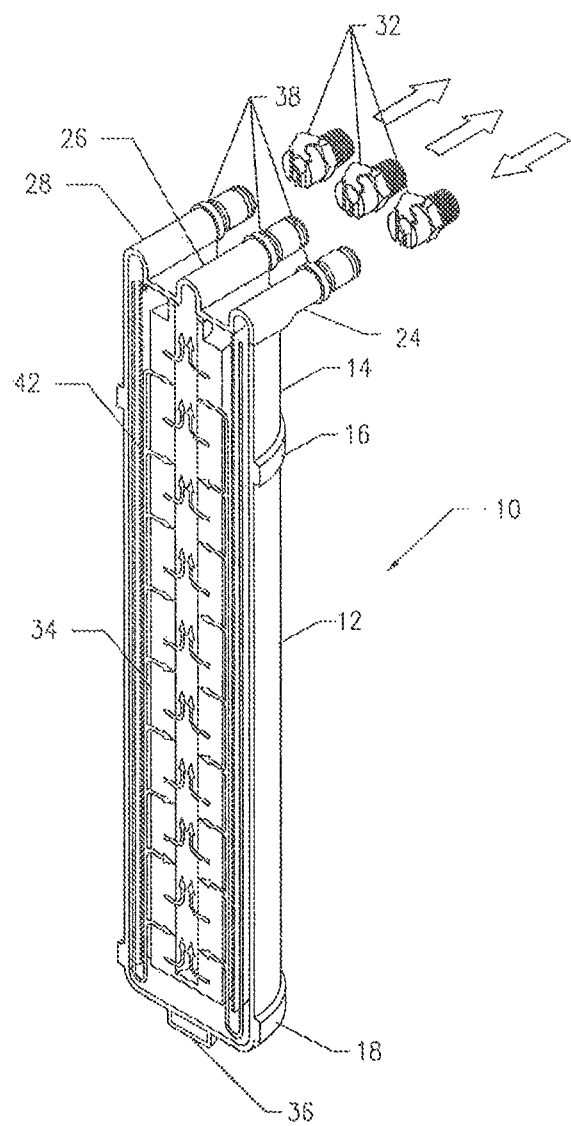
FIG. 7 is a sectional perspective view of a filter capsule and ports fittings according to a further embodiment of the disclosure.
Figure 11:
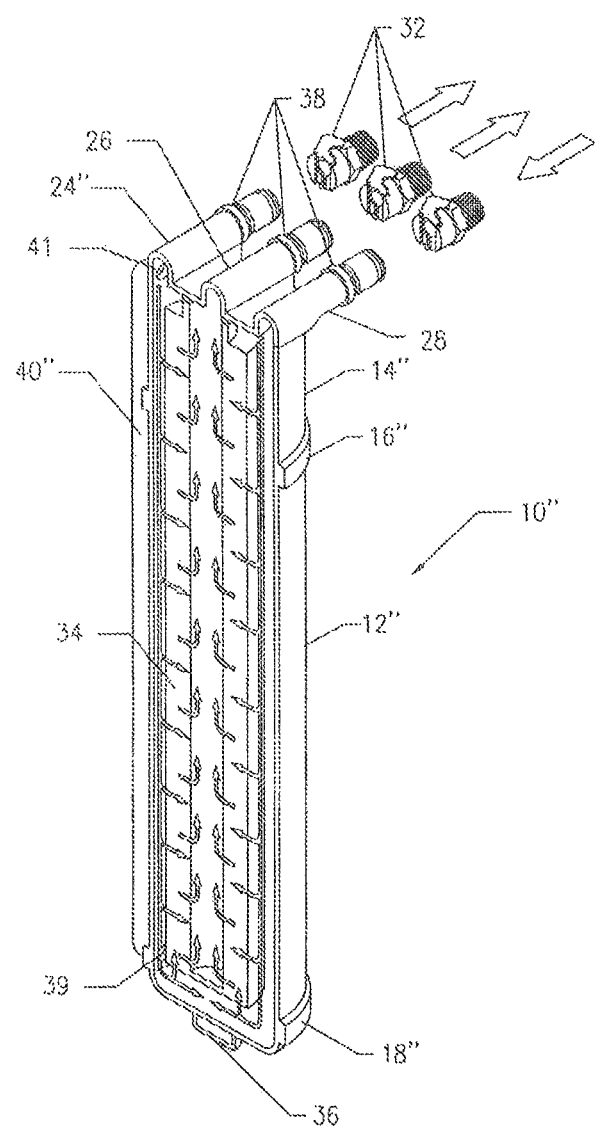
FIG. 11 is a sectional, perspective view of the filter capsule and port fittings according to the embodiment of the disclosure shown in FIG. 8.

In another aspect of the disclosure as shown in FIG. 7, an encapsulating shield 42 is formed in the annular cavity between filter 34 and the inner wall of capsule 10. The upper end of shield 42 creates a partition between the three ports so that each is isolated from the others. A bottom end of shield 42 does not extend to the bottom of capsule 10 so as to provide a fluid path between the two annular chambers formed by the presence of shield 42. A first chamber 43 is formed between the inner wall of capsule 10 and the outer wall of shield 42. A second chamber 45 is formed between the inner wall of shield 42 and the outer wall of filter 34.

Fluid introduced into the capsule flows from the inlet port 24 into first annular chamber 43. The fluid flows down the first annular chamber until reaching the bottom of capsule 10. The flow then traverses the end of shield 42 and flows up into second annular chamber 45 from which the fluid enters into and traverses the filter. The fluid next flows out of the filter into the central chamber and out the outlet port 26. In this configuration, vent port 28 must be closed to ensure the flow follows the stated path through the annular chambers and out the outlet port.

The use of shield 42 established a countercurrent of flow that allows the some of the heat from the higher temperature fluid in first annular chamber to transfer through shield 42 (particularly if the shield is constructed from materials having good heat transmission such as aluminum) into the upwardly flowing and lower-temperature fluid in second annular chamber 45. This heat exchange enables the fluid to achieve a relatively uniform temperature gradient as the highest temperature fluid at the very top in first chamber 43 will transfer heat to the coolest fluid at the top of second chamber 45. The next highest temperature fluid below the hottest fluid at the top will transfer heat to the next coolest level of fluid in the second chamber until the fluid reaches the bottom of the shield where the temperature of the fluid on either side of the bottom of shield 42 is approximately equivalent. If heat transfer through shield 42 is undesirable, shield 42 may be constructed from poor heat conducting materials as are well known in the art.

In a yet further aspect of the disclosure as shown in FIG. 4, a filter capsule 10' is formed with, or has appended thereto, a plurality of ports that extend substantially upwardly from a top surface of a top cap 14'. It should be understood that elements referenced with primed numbers in one embodiment correspond to elements in other embodiments with the same unprimed or differently primed numbers. Capsule 10' includes a substantially cylindrical body 12' that defines a generally hollow filter chamber configured to hold one or more filters. Capsule 10' may be formed in other regular or irregular geometric shapes to accommodate a wide variety of larger assembly configurations to which the capsule is attached and/or to accommodate a wide variety of filter shape configurations depending upon the application.

To enclose a proximal, top end of capsule body 12', a top cap 14' having a substantially cylindrical shape conformed to the shape and dimensions of capsule body 12' and having one enclosed end and an opposing open end is thermally welded to the proximal end of capsule body 12' to form a top cap joint 16'. In an alternative embodiment, capsule body 12' and top cap 14' may be formed with corresponding threaded surfaces or male/female segments as alternative means to secure top cap 14' to capsule body 12'. If snap-fit surfaces are used, sealing components. e.g. O-rings may be used to create an air/fluid tight seal. Top cap 14' may be joined to capsule body 12' before or after the installation of filters depending upon whether the other end of capsule 10' has been closed.

To enclose a distal, bottom end of capsule 10', a bottom cap 18' having a substantially cylindrical shape conformed to the shape and dimensions of capsule boy 12' and having an enclosed end and an opposing open end is thermally welded to the distal end of capsule body 12' to form bottom cap joint 20'. In an alternative embodiment, capsule body 12' and bottom cap 18' may be formed with corresponding threaded surfaces or male/female segments as alternative means to secure bottom cap 18' to capsule body 12'. If snap-fit surfaces are used, sealing components, e.g., O-rings may be used to create an air/fluid tight seal. Like top cap 14', bottom cap 18' may be joined to capsule body 12' before or after installation of filters depending upon whether the other end of capsule 10' has been closed. Bottom cap 18' may be formed with a mounting post 22' configured to receive corresponding mounting appendages from a larger assembly such as a mounting panel.

In an alternative embodiment, in place of mounting post 22', a drainage port may be formed in bottom cap 18' to allow fluids to be drained from the bottom end of capsule 10' without engaging a port formed in top cap 14' dedicated as an outlet port as more fully described below. The drainage port may be configured as a male or female connector and may also include quick disconnect fittings and a modular or integrated check valve.

Formed on, or appended to, top cap 14', are a plurality of ports configured to provide fluid communication with fluid delivery or extraction sources. A cannula-shaped inlet port 24' is essentially hollow and formed on, or secured to, a lateral edge of top cap 14' to provide a means to infuse fluids and/or gases into the filter chamber contained in capsule 10'. The location of the interface/juncture of inlet port 24' may be positioned at other locations other than a lateral edge of top cap 14'.

Inlet port 24' includes modular or integral male or female fittings to accommodate and receive corresponding fittings of fluid delivery tubes or channels to allow fluids and/or gases to traverse the tube/port juncture in an essentially leak free, airtight manner. Inlet port 24' may also include an integral or modular check valve to prevent the release of fluids or spillage when capsule 10' is disassembled to remove, replace or service the internal filter(s).

Formed on, or appended to, a lateral edge of top cap 14' opposite the lateral edge occupied by inlet port 24' is a cannula-shaped vent port 26'. Vent port 28' is essentially hollow and formed on, or secured to, top cap 14 to provide a means of egress for undesired fluids and/or gases present in the filter chamber contained in capsule 10'. It also provides a means to register the internal pressure of capsule 10' to ambient pressure conditions. The location of the interface/juncture of vent port 26' may be positioned at other locations other than a lateral edge of top cap 14'.

Vent port 26' includes modular or integral male or female fittings to accommodate and receive corresponding fittings of fluid receiving tubes or channels to allow fluids and/or gases to traverse the tube/port juncture in an essentially leak free, airtight manner. Vent port 26' may also include an integral or modular check valve to prevent the release of fluids or spillage when capsule 10' is disassembled to remove, replace or service the internal filter(s).

Also appended to top cap 14' is a cannula-shaped outlet port 28'. Outlet port 28' may be formed on, or appended to, top cap 14' at essentially a center of cap 14'. A cylindrical projection 30' may be formed as an interface between top cap 14' and outlet port 28'. Projection 30' provides an enclosed area above the plane of top cap 14' to allow air, or other unwanted substances or gases to rise and concentrate for release through outlet port 28'. This configuration allows capsule 10' to be completely filled with a desired fluid and/or gas without compromising any area of the chamber formed by capsule 10' dedicated to housing filters in a desired fluid and/or gas.

Outlet port 28' includes modular or integral male or female fittings to accommodate and receive corresponding fittings of fluid receiving tubes or channels to allow fluids and/or gases to traverse the tube/port juncture in an essentially leak free, airtight manner. Outlet port 28' may also include an integral or modular check valve to prevent the release of fluids or spillage when capsule 10' is disassembled to remove, replace or service the internal filter(s).

In this aspect of the disclosure, ports 24', 26', 28' are oriented in substantially the same plane wherein each port extends vertically or upwardly from capsule 10' wherein the occupied plane by the ports is substantially parallel to a longitudinal axis of capsule 10'. Alternatively, the ports may occupy a plane that forms an angle with the longitudinal axis that is about +/−45° from the parallel orientation. In a further alternative embodiment, the ports may or may not occupy the same plane and instead, be offset to accommodate attachment to larger customized assemblies.

This configuration with substantially uniform port orientations whereby the ports extend substantially vertically from the top of capsule 10' does not reduce the overall height of the apparatus, but facilitates the manual connection to mated fittings when the mated fittings are not panel mounted. The addition of quick couplings further eases installation. And the location of all the ports at substantially the highest point of capsule 10' allows for removal of the contained filters without spillage.

In another aspect of the disclosure, a transfer tube 40' is formed integral with, or appended to, an inside wall of capsule 10' to provide a channel for delivering warm fluids and/or gases from a top end of capsule 10' to a bottom end of capsule 10' without requiring the fluid and/or gas to flow through the filter chamber. A top end of the transfer tube is connected to, and in fluid communication with, inlet port 24'. A bottom end of the transfer tube is open to, and in fluid communication with, a bottom end of the filter chamber formed by capsule 10' to permit the entry of fluid into the chamber at the lowest point in the chamber. In an alternative embodiment, a check valve can be formed integral to, or installed within a distal end of transfer tube 40' to prevent backflow of the fluid and/or gas up the transfer tube and into inlet port 24'.

In a further embodiment of the disclosure, as shown in FIGS. 8-11, an exterior transfer tube 40" is formed on an outside surface of a capsule 10". A top end of the tube is connected to, and in fluid communication with, an inlet port 24" via a top bore 41. A bottom end of the tube is connected to a bore 39 formed in either a bottom end of capsule 10", or a side wall of a bottom cap 18" so as to provide fluid communication with the interior of capsule 10".

With the use of external transfer tube 40", fluids and/or gases, and heated fluids and/or gasses in particular, can be introduced into the filter chamber at substantially the bottom most end of the filter chamber to harness the natural tendency of heated, and therefore, less dense, fluids and/or gases to rise so as to allow the heat introduced into the chamber to transfer up into the higher layers of fluid and/or gas to ensure a relatively uniform temperature gradient. Prior art systems have the top mounted inlet ports channeling fluids and/or gasses into the uppermost end of the filter chamber that causes substantial temperature gradients to form as the cooler fluid and/or gas tends to migrate to the bottom of the chamber while the hotter fluid and/or gas tends to remain in the upper end of the chamber.

In a yet further aspect of the disclosure, an RFID chip 36 is attached to, or embedded in, a bottom portion of bottom cap 18. In an alternative embodiment, the bottom of capsule 10 is formed as an integral part of the capsule with chip 36 embedded in the capsule forming material during manufacture. Chip 36 is embedded so as not to have any exposure to fluid or gas either inside or outside capsule 10, and to ensure the chip is not lost or improperly replaced with an unauthorized chip such as is possible with chips secured to items with adhesive and the like. Chip 36 is configured to endure high temperature environments and is rated for high temperatures. With this configuration, chip 36 can be exposed to the high temperatures of hot water sanitation processes.

Referring now to FIGS. 12-14, in another aspect of the disclosure, a filter capsule shown designated generally as 10$^v$ includes a capsule housing or shell wall 12$^v$, an upper end or end cap 14$^v$ and a lower end or end cap 16$^v$. The combination of the shell wall and end caps defines a filter chamber within which is secured a filter cartridge or filter material as disclosed below. The end caps may be integral to, or modular with, the shell wall. Additional variations include one end being integral with the shell wall and the other end end cap secured to the shell wall. Any combination of integral or modular ends/end caps are within the spirit and scope of the disclosure. The means used to secure the end caps to the shell wall are those disclosed herein for other embodiments of the disclosure.

An inlet port $24^V$ extends radially from top end $14^V$ and may be formed to receive fittings such as quick connects. An outlet port $26^V$ extends radially from top end $14^V$ and is positioned with a proximal end substantially centrally located on the top end. An optional vent port $28^V$ also extends radially from top end $14^V$ in substantially the same plane occupied by inlet port $24^V$ and outlet port $26^V$. All of the ports may be formed to receive fittings such as quick connects and the like as disclosed for other embodiments of the disclosure.

Extending downwardly and in fluid communication with the proximal end of outlet port $26^V$ is outlet transfer tube 58 that defines an outlet channel 60. Outlet tube 58 is configured to extend only partially down the overall length of the capsule chamber and is nonporous. A filter cartridge or membrane 68 is positioned in the end of the capsule chamber opposite the end from which the ports extend. Filter membrane 68 defines a filter membrane core 70 in fluid communication with outlet channel 60. The combination of core 70 and outlet tube channel 60 provide a continuous downstream path for fluid and/or gas flow through the capsule housing from a bottom end of the capsule to the top.

For purposes of illustration and not limitation, for liquid processing applications, the filter material or media in the filter cartridge or membrane 68 (also broadly defined as filter material or media) may be formed from materials selected from the group consisting of polyethersulfone, nylon, cellulose acetate, cellulose nitrate, polyvinylidene fluoride, polycarbonate, polyacrylonitrile, mixed esters of cellulose, glass fiber, polyethylene, polytetrafluoroethylene and combinations thereof. Other filter materials well known in the art may also be used for this purpose and be within the scope of this disclosure.

Again for purposes of illustration and not limitation, for gas processing applications, the filter material or media in the filter cartridge or membrane 68 may be formed from materials selected from the group consisting of polyvinylidene fluoride, glass fiber, polyethylene, polytetrafluoroethylene and combinations thereof. Other filter materials well known in the art may also be used for this purpose and remain within the scope of this disclosure.

It should be understood further that any of the members of these two sets of materials may be used with their natural surface properties, or may be modified completely or partially to accommodate the material for use with liquids and/or gases. For example, one member of the illustrative list for gas applications may have its surface altered to accommodate its use with liquids. Multiple combinations of the listed materials from both sets are also possibilities for material selection. Moreover, a material identified as being particularly advantageous for gas applications may, for example, in some instances, be useful for liquid applications and vice versa.

The filter material or media in the filter cartridge or filter membrane 68 may be formed with pores ranging in size from about 0.2 microns to about 500 microns. Filter 68 may also be a HEPA (high efficiency particulate air) or an ULPA (ultra low particulate air) filter as is known in the art.

Although shown as a single cartridge 68, multiple cartridges 68 may be secured in the bottom end of housing $10^V$ in stacked or multi-round configurations with the multiple cores 70 joined together for stacked configurations, or with a manifold 90 that connects to, and is in fluid communication with, outlet tube 58 for multi-round configurations. The cartridges may be constructed from similar filtering materials, (membranes and other media) with similar characteristics, e.g., pore size porosity, etc.), or may differ as to materials and/or characteristics to impart selectable filtering properties tailored to a specific application. The entire apparatus may use purely gravitational force to filter incoming liquids and gases, or may use pressure to facilitate the filtering process.

A media boundary sheet 72 is positioned above filter membrane to keep loose particulates and media in a designated place separate from the cartridge filter 68 and secured to the walls of the capsule chamber as well as to outlet tube 58. Boundary sheet 72 functions as a mechanical boundary to prevent loose media material from clogging the pores of filter membrane 68. Boundary sheet 72 is porous to permit the passage of liquids and/or gases processed through the filter capsule. The pore sizes for boundary sheet 72 may be from about 10 microns to about 500 microns. The combination of the capsule chamber, upper end $14^V$, boundary sheet 72 and a radially outer wall of outlet tube 58 define a toroidal chamber within which is placed loose media based filter material 66. Filter material 66 may be selected from the group consisting of DI resin, carbon fiber cotton fiber granular carbon, polymeric yarn, sand or other natural or synthetic granular media and combinations thereof.

Capsule $10^V$ is designed to operate in a pressurized system with pressures ranging up to about 100 psi. For liquid and/or gas filtration, the subject liquid and/or gas is flowed into inlet port 76 and into a top end of capsule $10^V$. The fluid and/or gas percolates through filter resin 66 and into filter membrane 68 via boundary layer 72. The fluid and/or gas flows through filter membrane 68 and enters filter membrane core 70 and flows up into outlet tube channel 60 and out outlet port 64.

The capsules, caps, tubes and ports described herein may be constructed from high heat resilient plastics, such as polypropylene, polyethylene, nylon, PFA and the like. The materials are used in conventional injection molding processes to create the capsules and related components. A key consideration for material selection is the material's ability to withstand high heat environments such as those found in sterilization equipment and autoclaves, as well as other sterilization means like gamma irradiation.

The quick couplings are configured to be compatible with coupling components manufactured and sold by, by way of example and not limitation, Linktech (Ventura, Calif.), Colder Plastics Company (St. Paul, Minn.) and John Guest Corp. (Fairfield, N.J.). The check valves may be of any conventional variety known in the art that ensures one-way flow of fluids and/or gases that flow through the capsules. Examples include those sold by the aforementioned companies. It should further be understood that the male/female configuration of the set of quick-connect couplings incorporated onto a capsule may be all male, all female, or a combination of both depending upon the particular application.

While the present disclosure has been described in connection with several embodiments thereof, it will be apparent to those skilled in the art that many changes and

What we claim as new and desire to secure by United States Letters Patent is:

1. A filter capsule apparatus comprising:
a capsule shell having a shell wall with portions defining a solid, channel-free capsule bottom end;
a top cap secured to a top end of the shell wall, wherein the combination of the shell wall, the capsule bottom end and the top cap define a filter chamber having a top chamber end proximal to and partially defined by the top cap and a bottom chamber end proximal to and partially defined by the capsule channel-free bottom end;
a filter secured in the filter chamber, wherein an annular space is defined by the shell wall and an exterior surface of the filter, wherein the annular space extends uninterrupted the entire axial length of the filter, wherein a bottom space is defined by a bottom end of the filter, an inner surface of the capsule bottom end and an annular segment of the shell wall below the plane occupied by the bottom end of the filter, wherein the bottom space is in uninterrupted fluid communication with the annular space, and wherein heated fluid is permitted to enter the filter radially inwardly along the axial length of the filter from the annular space;
a plurality of ports including an inlet port extending from the top cap,
a transfer tube having an elongate tube cylindrical wall in fluid isolation from the annular space and the filter, connected along its length to, and extending along the length of, the shell wall, wherein a portion of the tube cylindrical wall along its axial length is integral with, or registered against, the shell wall, wherein a fluid receiving first end is secured to, and in fluid communication with, the inlet port and a fluid delivery second end is secured in close proximity to the capsule bottom end; and,
a dispersion ring formed on, or secured to, a peripheral annular edge of the top inner surface of the capsule bottom end within the filter chamber, wherein the dispersion ring has a plurality of dispersion ring bores or slots, wherein the dispersion ring is in fluid communication with the second end of the transfer tube, and wherein the dispersion ring is in fluid communication with the filter chamber via the plurality of ring bores or slots, whereby higher-heat, lower-density heated fluid introduced into the filter capsule enters through the inlet port, travels downwardly inside the transfer tube, exits the transfer tube second end into the dispersion ring, exits the dispersion ring through the ring bores or slots into the uninterrupted bottom space of the filter chamber, and flows upwardly in the uninterrupted annular space of the filter chamber into the filter, whereby the heated fluid transfers heat to lower-heat, higher-density fluid positioned at a higher elevation in the filter chamber than the in-flowing heated fluid in a fluid column formed in the filter chamber to maintain all the fluid in the fluid column at a substantially uniform temperature throughout the axial length of the filter chamber.

2. The filter capsule of claim 1 wherein the plurality of ports extend from the top cap in a uniform direction.

3. The filter capsule of claim 2 wherein the plurality of ports occupy substantially the same plane wherein the plane is parallel to a longitudinal axis of the shell.

4. The filter capsule of claim 2 wherein the plurality of ports occupy substantially the same plane wherein the plane is substantially orthogonal to a longitudinal axis of the shell.

5. The filter capsule of claim 2 wherein the plurality of ports occupy substantially the same plane wherein the plane is +/−45° from a plane orthogonal to a longitudinal axis of the shell.

6. The filter capsule of claim 4 wherein at least one of the plurality of ports has a quick connect connector secured to the one port.

7. The capsule of claim 4 wherein each of the plurality of ports has an integral quick connect connector.

8. The filter capsule of claim 4 wherein at least one port of the plurality of ports has a dedicated check valve secured to the one port.

9. The filter capsule of claim 1 wherein the transfer tube is secured to an inner wall of the shell.

10. The filter capsule of claim 1 wherein the transfer tube is secured to an outer wall of the shell.

11. The filter capsule of claim 1 further comprising an RFID chip secured to the shell.

12. The filter capsule of claim 1 further comprising an RFID chip embedded in material forming the shall.

13. The filter capsule of claim 1 wherein the to cap has portions defining a projection chamber, wherein the projection chamber is in fluid communication with one of the plurality of ports.

14. The filter chamber of claim 1 further comprising a mounting port formed on a bottom of the shell.

15. A filter capsule apparatus comprising:
a shell having a shell wall;
a bottom cap secured to a bottom end of the shell wall;
a top cap secured to a top end of the shell wall, wherein the combination of the shell wall, the bottom cap and the top cap define a filter chamber, wherein the filter chamber has a chamber bottom end proximal to the bottom cap;
at least one filter cartridge secured in the chamber bottom end, wherein the at least one filter cartridge defines at least one downstream outlet core;
a plurality of ports including an outlet port extending from a top end of the top cap;
an outlet transfer tube secured in the chamber to the top cap away from the shell wall and extending downwardly a portion of the length of the shell wall; wherein the transfer tube is connected to, and in fluid communication with, the outlet port at a top end, and is connected to, and in fluid communication with, the at least one cartridge outlet core at a bottom end;
a porous media boundary sheet having pores with a pore size from about 10 microns to about 500 microns and a perimeter, wherein the boundary sheet perimeter is secured along its entire length to the shell wall above the filter cartridge and attached about the outlet transfer tube, wherein the combination of the media boundary sheet, an outer surface of the outlet transfer tube, an inner surface of the shell wall and the top cap form a particulate filter media chamber separate from the bottom end of the filter chamber where the filter cartridge is secured, wherein the porous media boundary sheet permits the passage of liquids and/or gases; and,
particulate media secured in the particulate media chamber.

16. The filter capsule of claim 15 wherein the plurality of ports extend from the top cap in a uniform direction.

17. The filter capsule of claim 16 wherein the plurality of ports occupy substantially the same plane wherein the plane is parallel to a longitudinal axis of the shell.

18. The filter capsule of claim 16 wherein the plurality of ports occupy substantially the same plane wherein the plane is substantially orthogonal to a longitudinal axis of the shell.

19. The filter capsule of claim 16 wherein the plurality of ports occupy substantially the same plane wherein the plane is +/−45° from a plane orthogonal to a longitudinal axis of the shell.

20. The filter capsule of claim 16 wherein at least one of the plurality of ports has a quick connect connector secured to an end of the at least one port.

21. The filter capsule of claim 16 wherein at least one port of the plurality of ports has a check valve secured to the one port.

22. The filter capsule of claim 15 further comprising an RFID chip secured to the shell.

23. The filter capsule of claim 15 further comprising an RFID chip embedded in material forming the shell.

24. The filter capsule of claim 15 wherein the top cap has portions defining a projection chamber, wherein the projection chamber is in fluid communication with one of the plurality of ports.

25. A filter capsule apparatus comprising:
a capsule shell having a shell wall with portions defining a solid, channel-free capsule bottom end;
a top cap secured to a top end of the shell wall, wherein the combination of the shell wall the bottom end and the top cap define a filter chamber having a top chamber end proximal to and partially by the top cap and a bottom chamber end proximal to and partially defined by the channel-free capsule bottom end;
a filter secured in the filter chamber, wherein an annular space is defined by the shell wall and an exterior surface of the filter, wherein the annular space extends uninterrupted the entire axial length of the filter, wherein a bottom space is defined by a bottom end of the filter, an inner surface of the capsule bottom end and an annular segment of the shell wall below the plane occupied by the bottom end of the filter, wherein the bottom space is in fluid communication with the annular space, and wherein heated fluid is permitted to enter the filter radially inwardly along the axial length of the filter from the annular space;
a plurality of ports including an inlet port extending from the top cap,
a transfer tube having an elongate tube cylindrical wall in fluid isolation from the annular space and the filter, connected along its length to, and extending along the length of, the shell wall, wherein a portion of the tube cylindrical wall along its axial length is integral with, or registered against, the shell wall, wherein a fluid receiving first end is secured to, and in fluid communication with, the inlet port and a fluid delivery second end is secured in close proximity to the capsule bottom end of the capsule shell; and,
a dispersion plate having a plurality of dispersion plate bores or slots formed proximal to a peripheral annular edge of the dispersion plate, wherein the dispersion plate is secured in the filter chamber within the bottom space, wherein the combination of the dispersion plate, filter chamber wall and the inner surface of the capsule bottom end define an uninterrupted dispersion chamber that extends uninterrupted the entire width of the filter chamber; wherein the dispersion chamber is in fluid communication with the second end of the transfer tube and wherein the dispersion chamber is in fluid communication with the bottom space and annular space of the filter chamber via the plurality of dispersion plate bores or slots whereby higher-heat, lower-density heated fluid introduced into the filter capsule enters through the inlet port, travels downwardly inside the transfer tube, exits the transfer tube second end into the dispersion chamber, exits the dispersion chamber through the dispersion plate bores or slots into the bottom space of the filter chamber, and flows upwardly in the uninterrupted annular space of the filter chamber into the filter, whereby the heated fluid transfers heat to lower-heat, higher-density fluid positioned at a higher elevation in the filter chamber than the in-flowing heated fluid in a fluid column formed in the filter chamber to maintain all the fluid in the fluid column at a substantially uniform temperature throughout the axial length of the filter chamber.

26. The filter capsule of claim 25 wherein the plurality of ports extend from the top cap in a uniform direction.

27. The filter capsule of claim 26 wherein the plurality of ports occupy substantially the same plane wherein the plane is parallel to a longitudinal axis of the shell.

28. The filter capsule of claim 26 wherein the plurality of ports occupy substantially the same plane wherein the plane is substantially orthogonal to a longitudinal axis of the shell.

29. The filter capsule of claim 26 wherein the plurality of ports occupy substantially the same plane wherein the plane is +/−45° a from a plane orthogonal to a longitudinal axis of the shell.

30. The filter capsule of claim 28 wherein at least one of the plurality of ports has a quick connect connector secured to the one port.

31. The filter capsule of claim 28 wherein each of the plurality of ports has an integral quick connect connector.

32. The filter capsule of claim 28 wherein at least one port of the plurality of ports has a check valve secured to the one port.

33. The filter capsule of claim 28 wherein each of the plurality of ports has dedicated check valve secured thereto.

34. The filter capsule of claim 25 wherein the transfer tube is secured to an inner wall of the shell.

35. The filter capsule of claim 25 wherein the transfer tube is secured to an outer wall of the shell.

36. The filter capsule of claim 25 further comprising an RFID chip secured to the shell.

37. The filter capsule of claim 25 further comprising an RFID chip embedded in material forming the shell.

38. The filter capsule of claim 25 wherein the top cap has portions defining a projection chamber, wherein the projection chamber is in fluid communication with one of the plurality of ports.

39. The filter chamber of claim 25 further comprising a mounting port formed on a bottom of the shell.

* * * * *